UNITED STATES PATENT OFFICE.

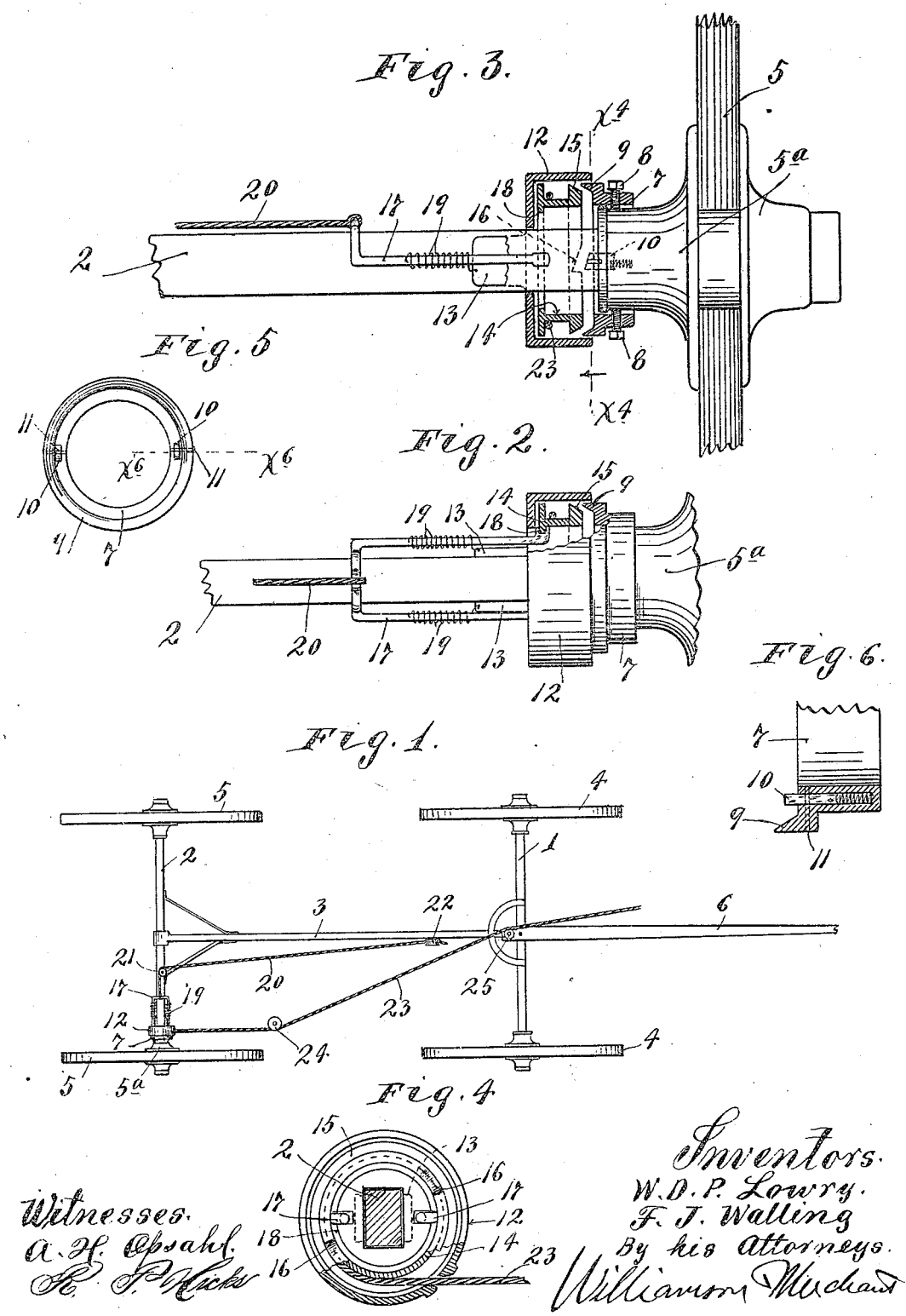

WILLIAM D. P. LOWRY AND FREDERICK J. WALLING, OF MINNEAPOLIS, MINNESOTA.

HITCHING ATTACHMENT FOR WHEELED VEHICLES.

961,976.              Specification of Letters Patent.    Patented June 21, 1910.

Application filed November 7, 1908.   Serial No. 461,498.

*To all whom it may concern:*

Be it known that we, WILLIAM D. P. LOWRY and FREDERICK J. WALLING, citizens of the United States, residing at Minneapolis, in the county of Hennepin and State of Minnesota, have invented certain new and useful Improvements in Hitching Attachments for Wheeled Vehicles; and we do hereby declare the following to be a full, clear, and exact description of the invention, such as will enable others skilled in the art to which it appertains to make and use the same.

Our invention has for its object to provide an improved horse hitching attachment for wheel vehicles, and to this end, it consists of the novel devices and combinations of devices hereinafter described and defined in the claim.

This improved hitching attachment is arranged to be applied to an axle and one or more of the wheels of the vehicle, and a one-way clutch device is provided, together with means for connecting the clutch members, at will, so that when the wheel is rotated by forward movement of the vehicle, a hitching strap or other flexible connection will be wound upon the drum and caused to pull backward on the bit or bridle, thus preventing runaways.

In the accompanying drawings which illustrate the invention, like characters indicate like parts throughout the several views.

Referring to the drawings: Figure 1 is a plan view, showing the running gear of a wagon or carriage and showing our improved hitching device applied to the rear axle and to one of the rear wheels thereof; Fig. 2 is a fragmentary plan view with some parts broken away and some parts sectioned, showing the clutch mechanism and windlass drum of the hitching device; Fig. 3 is a view partly in elevation and partly in section, of the same parts that are shown in Fig. 2; Fig. 4 is a detail view partly in section on the line $x^4$ $x^4$ of Fig. 3, with some parts shown in full and with some parts broken away; Fig. 5 is a detail, showing the clutch sleeve that is detachably, but rigidly secured to the hub of the wheel; and Fig. 6 is a section taken on the line $x^6$ $x^6$ of Fig. 5, some parts being broken away.

Of the parts of the wagon, it is only necessary to note the pivoted front axle 1, the rear axle 2, the reach 3, the front wheels 4, the rear wheels 5, and the pole 6.

In carrying out our invention in its preferred form, a clutch ring 7 is telescoped onto the inner end of the hub $5^a$, and is rigidly but detachably secured thereto by set screws 8. This ring 7, at its inner end, is provided with a laterally projecting internally tapered or flaring flange 9, and in its body, it is provided with one or more (as shown two diametrically opposite) spring pressed clutch dogs 10, the outer ends of which are beveled in the same direction, and the outward movements of which are limited by stop pins 11.

The rear axle, 2, as is usual, is rectangular in cross section, and rigidly secured thereon, adjacent to the rotary clutch ring 7, is a casing 12, the outer end of which is open so that the flange 9 of said ring 7 is telescoped slightly into the said casing. As shown, said casing 12 is provided with lugs 13 that are riveted or otherwise directly secured to the said axle.

Mounted to rotate within the casing 12 and around the axle 2, is a grooved annular windlass drum 14, having at its outer end an externally tapered flange 15 that is adapted to engage the internally tapered flange 9 of the clutch ring 7, to center or axially aline the said drum in respect to said clutch ring 7 when the two are forced endwise together. This annular drum 14 is provided, in its outer end, with clutch notches 16 adapted to be engaged by the projecting ends of the clutch dogs 10, when said drum is forced outward against the clutch ring 7. It will therefore be seen that the said annular drum 14, with its notches 16, serves as one of the clutch members, and might be designated as the movable clutch ring.

The axial movements of the drum 14, are controlled by a shifting device 17, which as shown, is approximately U-shaped and is provided at the ends of its prongs, with notches that loosely engage an inwardly extended flange 18 of the drum 14. The prongs of the shifting device or fork 17 work through suitable passages in the head of the casing 12, and the outer portion thereof is bent to rest upon the body of the axle 2. Coiled springs 19, as shown attached to the prongs of the shifting fork 17 and to the lugs 13 of the casing 12, tend to move the drum or clutch member 14 into engagement with the clutch ring 7. Normally, however, said springs are overcome, and the said drum 14 is held in its inoperative position, shown in the drawings, by a suitable connection, which, as shown, is in the form of a cable 20. Also, as shown, the cable 20 is passed over guide sheaves 21 and 22 on the rear axle 2 and reach 3, respectively. The forward end of the cable 20, will, in practice, be brought up through the bottom of the vehicle body and provided with suitable means, such as a hook, for instance, by means of which it may be anchored in a position to hold the drum 14 disengaged from the clutch ring 7.

The connection which extends from the bits or bridle of the horse or of the team, is shown as in the form of a cable or rope 23, the rear end of which is attached to the drum 14, and is adapted to be wound up within the peripheral groove thereof. Also, as shown, this cable 23 runs over guide sheaves 24 and 25, the former of which will be suitably attached to the vehicle body (not shown), and the latter of which is shown as applied to the rear end of the pole 6. This arrangement, may however, be very greatly varied.

With the parts adjusted as shown in the drawings, it is evident, that when the wheel 5 is rotated, under forward movement of the wagon, or when the said wheel is rotated in a reverse direction by backing up of the wagon, the clutch dogs 10 will move free of the drum or clutch ring 14, and hence, of course, the hitching cable or line 23 will remain free from tension. When, however, the said drum or clutch ring 14 is released, and by the spring 19, is forced into engagement with the said clutch ring 7, and the wagon is then moved forward, the clutch dogs 10 will engage the clutch notches 16 and will positively rotate the drum 14 in a direction to wind up the hitching cable or strap 23, and thereby check or pull back upon the horse or horses so as to prevent runaways.

By reference to Fig. 4, it will be noted that the cable or strap 23 passes through a suitable perforation in the periphery of the drum supporting casing 12. If the wheel be turned backward, while the drum is forced against the clutch ring, the spring pressed driving dogs would be cammed into inoperative positions, and hence, will not rotate the drum backward, and therefore, will not wind up the hitching connection when the vehicle is backed up. This device, therefore, prevents the horse or team from going forward with the vehicle when hitched thereby, but does not go into action in case the vehicle is backed up.

The device described is capable of being applied to any wagon or carriage, and furthermore, is of small cost, and at the same time, is highly efficient for the purposes had in view.

What we claim is:

The combination with a wheeled vehicle, of an annular windlass drum having an externally tapered flange, a casing inclosing said drum and holding the same loosely around an axle thereof with freedom for both rotary and axial movements, a clutch ring carried by the hub of an adjacent wheel and having an internally tapered flange, a pawl and ratchet device, one member of which is carried by said hub and the other by said drum, said pawl and ratchet device serving to rotate said drum in one direction only, and connections for moving said windlass drum axially to and from operative positions, substantially as described.

In testimony whereof we affix our signatures in presence of two witnesses.

WILLIAM D. P. LOWRY.
FREDERICK J. WALLING.

Witnesses:
H. D. KILGORE,
ALICE J. SWANSON.